(12) United States Patent
Verma et al.

(10) Patent No.: US 12,149,520 B2
(45) Date of Patent: Nov. 19, 2024

(54) DEVICE ENROLLMENT IN A UNIFIED ENDPOINT MANAGEMENT SYSTEM OVER A CLOSED NETWORK

(71) Applicant: VMware, Inc., Palo Alto, CA (US)

(72) Inventors: Gaurav Verma, Bangalore (IN); Karthikeyan Palanisamy, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 391 days.

(21) Appl. No.: 17/499,639

(22) Filed: Oct. 12, 2021

(65) Prior Publication Data

US 2023/0112606 A1   Apr. 13, 2023

(51) Int. Cl.
| | |
|---|---|
| H04L 9/40 | (2022.01) |
| G06F 8/61 | (2018.01) |
| G06F 16/955 | (2019.01) |
| G06K 7/14 | (2006.01) |
| G06K 19/06 | (2006.01) |
| G06F 9/445 | (2018.01) |

(52) U.S. Cl.
CPC ............ *H04L 63/0823* (2013.01); *G06F 8/61* (2013.01); *G06F 16/9566* (2019.01); *G06K 7/1417* (2013.01); *G06K 19/06037* (2013.01); *G06F 9/44505* (2013.01); *G06F 9/4451* (2013.01)

(58) Field of Classification Search
None
See application file for complete search history.

(56) References Cited

U.S. PATENT DOCUMENTS

| | | | |
|---|---|---|---|
| 6,542,933 B1 * | 4/2003 | Durst, Jr. ............ | G06F 16/9554 709/219 |
| 9,781,103 B2 * | 10/2017 | Moore .................. | H04L 9/3263 |
| 11,379,814 B2 * | 7/2022 | Moriki ............... | G06V 40/1365 |

(Continued)

FOREIGN PATENT DOCUMENTS

| | | | |
|---|---|---|---|
| CN | 1486551 A * | 3/2004 | ........... G06Q 20/045 |
| CN | 1516031 A * | 7/2004 | ........... G06F 9/5055 |

(Continued)

*Primary Examiner* — Eleni A Shiferaw
*Assistant Examiner* — Ali H. Cheema
(74) *Attorney, Agent, or Firm* — Kim & Stewart LLP

(57) ABSTRACT

Systems and methods are described for enrolling a user device in a Unified Endpoint Management ("UEM") system over a closed network. After an initial boot or factory reset of a user device, a user can scan a Quick Response code, or other scannable code, that is embedded with enrollment configuration data that includes configuration settings for communicating with a UEM server in the UEM system. Using the enrollment configuration data, the user device can retrieve an installation file for a management application. The user device can install the management application and give the management application access to the enrollment configuration data. The management application can disable hardcoded open network endpoints on the user device and configure the user device for UEM communications on the closed network. The user device can connect to the UEM server over the closed network and request enrollment in the UEM system.

20 Claims, 6 Drawing Sheets

(56) References Cited

U.S. PATENT DOCUMENTS

| | | | |
|---|---|---|---|
| 2013/0233916 A1* | 9/2013 | Tran | G06K 19/06037 |
| | | | 235/375 |
| 2015/0273326 A1* | 10/2015 | Heppe | A63F 13/26 |
| | | | 463/31 |
| 2015/0319142 A1* | 11/2015 | Herberg | H04L 9/3228 |
| | | | 713/171 |
| 2019/0356542 A1* | 11/2019 | Chamarajnager | H04L 63/0823 |
| 2020/0013026 A1* | 1/2020 | Noonan | G06Q 20/38215 |
| 2020/0366480 A1* | 11/2020 | Noonan | G06Q 20/38215 |
| 2021/0119874 A1* | 4/2021 | Ryman | H04L 67/51 |
| 2024/0039923 A1* | 2/2024 | Huang | H04L 63/0428 |

FOREIGN PATENT DOCUMENTS

| | | | | | |
|---|---|---|---|---|---|
| CN | 104469741 | A | * | 3/2015 | ............ H04W 4/001 |
| CN | 107925660 | A | * | 4/2018 | ......... G06F 16/9566 |
| EP | 0856812 | A2 | * | 8/1998 | ........... G06Q 20/343 |
| JP | 2004192075 | A | * | 7/2004 | |
| KR | 20130118138 | A | * | 10/2013 | ............. G06Q 30/02 |
| KR | 101884293 | B1 | * | 8/2018 | |
| RU | 2174254 | C1 | * | 9/2001 | |
| WO | WO-2019226115 | A1 | * | 11/2019 | |
| WO | WO-2019231348 | A1 | * | 12/2019 | ......... G06F 12/1408 |

* cited by examiner

DEVICE ENROLLMENT IN A UNIFIED ENDPOINT MANAGEMENT SYSTEM OVER A CLOSED NETWORK

BACKGROUND

Enterprise organizations frequently use Unified Endpoint Management ("UEM") or similar systems to manage user devices that employees use for work purposes. UEM systems typically require that a user device be enrolled before having access to access UEM data and services, which can include any type of data or services related to an enterprise or otherwise considered confidential in some respect. Enrolling can include installing a management agent or application that enforces UEM security settings and policies on the user device based on instructions from a server in the UEM system. Some operating systems ("OS") of user devices have introduced one or more modes for integrating UEM-related services with the OS. These modes (referred to herein as "Work Managed modes") can require that the user device enrolls with a UEM system when it boots for the first time or after a factory reset.

Some customers of UEM systems are highly secure organizations that only allow access and use of UEM services while the user device is connected to a closed network that the organization's servers, databases, clients, and other services reside on. The introduction of Work Managed modes has created an enrollment paradox for such closed network organizations. For example, a Work Managed mode can require that the user device download and install a management application and enroll in the UEM system during the user device's initial boot, but the user may not be able to input closed network configuration settings for a UEM system until after the user device finishes its initial boot. The user device would therefore be required to access an open network to enroll.

As a result, a need exists for providing an enrolling user device with closed network configuration settings during a Work Managed mode initialization sequence.

SUMMARY

Examples described herein include systems and methods for enrolling a user device in a UEM system over a closed network. In an example, an administrator ("admin") can use an admin console to embed enrollment configuration data in a Quick Response ("QR") code. As used herein, a QR code can include any code capable of storing information in a format that can be scanned in order to extract the stored information. The enrollment configuration data can include configuration settings and other information that a user device can use to securely connect to a UEM server on a closed network and enroll in the UEM system. The enrollment configuration data can include network settings for the closed network, a proxy configuration, information for creating or retrieving a security certificate, network settings for the UEM server, permissions for a management application, and any applicable settings for communicating with an auto discovery service.

In an example, the OS of the user device can include functionality for performing application programming interface ("API") calls to remote servers and other tools for integrating with UEM management services. In one example, the OS can be configured to look for instructions for integrating with a UEM system after an initial boot or a factory reset. When the user device boots initially or after a factory reset, the OS can provide an option to scan a QR code. The user can scan the QR code with the user device and the OS can retrieve the embedded enrollment configuration data. Using the enrollment configuration data, the OS can cause the user device to connect to a network and retrieve an installation file for the management application. The OS can then install the management application and can provide the management application with access to the enrollment configuration data.

In an example, the management application can use the enrollment configuration data to configure the user device for communicating with the UEM server on the closed network. In one example, the management application can disable all open network endpoints hardcoded into the OS, such as endpoints for analytics, feedback, and telemetric information. In another example, the management application can apply the network settings of the closed network so that the user device can locate and connect to the closed network. In another example, the management application can apply any proxy configuration requirements. In another example, the management application can either create a security certificate or retrieve a security certificate from a certificate endpoint based on instructions in the enrollment configuration data. In another example, the management application can apply permissions for the management application that are specified in the enrollment configuration data. In another example, the management application can configure the user device to retrieve discovery information for the UEM server from an auto discovery service. The auto discovery service, if utilized by the UEM system, can be a global service that requires access to an open network or a local service that is connected to the closed network. In an example, if an auto discovery service is not used, the UEM server settings can be included in the enrollment configuration data. The management application can configure the user device to retrieve the UEM server settings based on the configuration designated in the enrollment configuration data.

In an example, after all the configuration settings from the enrollment configuration data are applied, the management application can cause the user device to connect to the UEM server over the closed network and send an enrollment request. In one example, the enrollment request can include the security certificate. In another example, the enrollment request can include user profile information, such as user credentials, that the UEM server can use to authenticate the request. After authentication, the UEM server can enroll the user device in the UEM system.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for enrolling a user device in a UEM system over a closed network. After an initial boot or factory reset of a user device, a user can scan a QR code that is embedded with enrollment configuration data that includes configuration settings for enrolling with a UEM server. Using the enrollment configuration data, the user device can retrieve an installation file for a management application. The user device's operating system can install the management application and give the management application access to the enrollment configuration data. The management application can disable hardcoded open network endpoints on the user device and configure the user device for UEM communications on the closed network. The configuring can include changing permissions, adding proxy settings, creating or retrieving a security certificate, and installing network settings for the closed network. The user device can connect to the UEM server over the closed network and request enrollment in the UEM system. This system can allow a user device to enroll with a closed system without ever needing to connect to an open network, such as an open WI-FI network, providing valuable security for an enterprise.

Figure 1:
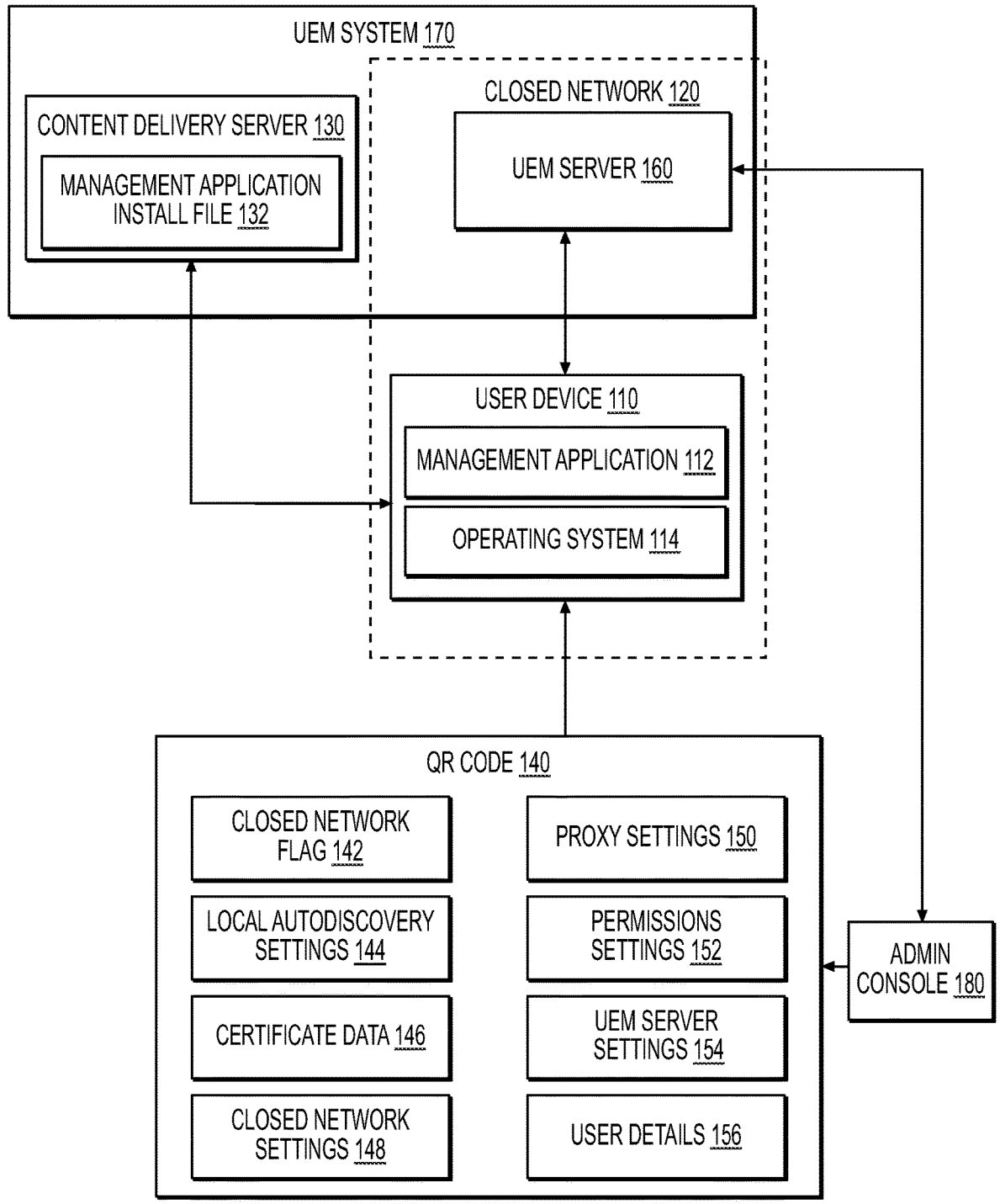
FIG. 1 is an illustration of an example system for performing enrolling a user device with a UEM system over a closed network.

FIG. 1 is an illustration of an example system for enrolling a user device 110 in a UEM system 170 over a closed network 120. The UEM system 170 can be any system that allows enterprises to manage work-related applications and data on enrolled user devices. Users can enroll their own devices, such as cell phones, tablets, or laptops. The user device 110 can represent a user device that is enrolling with the UEM system 170 and can be one or more processor-based devices, such as a personal computer, tablet, or cell phone. Enrollment can include installing a management application 112, managed applications, and other resources on the user device 110. The UEM system 170 can include one or more servers that perform various UEM-related functions, including multiple servers implemented virtually across multiple computing platforms.

In an example, the UEM system 170 can include a UEM server 160 that is responsible for managing enrolled user devices in the UEM system 170. The UEM server 160 is described herein as being responsible for enrolling user devices, like the user device 110, in the UEM system 170. However, enrollment can be handled by a separate server or group of servers in the UEM system 170 different than the server that manages the enrolled devices. In an example, enrollment can be handled by the management application 112. User devices like the user device 110 can retrieve a management application installation file 132 (hereinafter referred to as the "install file 132") from a content delivery server 130 that is associated with the UEM system 170. The management application 112 can be installed from the install file 132, and the management application 112 can communicate with the UEM server 160 to enroll the user device 110. Once enrolled, the UEM server 160 can manage enrolled user devices by sending management instructions to the management application 112. The management application 112 can be a stand-alone application, part of an enterprise application, or part of an operating system of enrolled devices.

In an example, the management application 112 can be responsible for ensuring that enrolled devices are up to date with compliance and security settings prior to accessing enterprise data and resources. The management application 112 can communicate with the UEM server 160, allowing UEM management of the enrolled devices based on compliance and security settings at the UEM server 160. The management application 112 can enforce compliance at the enrolled devices, such as by locking a device, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the enrolled devices can access enterprise or UEM resources through the UEM server 160.

In an example, the user device 110 can include an OS 114. The OS 114 can include system software for managing computer hardware and software resources, and provide common services for applications. In an example, the OS 114 can include API functionality and other tools for integrating with UEM management services. An example of an OS with such functionality is ANDROID OS with its featured ANDROID ENTERPRISE. In one example, the OS 114 can include featured modes that help facilitate various levels of UEM management. In one example mode, the OS 114 can create a separate, self-contained storage space on the user device 110 for UEM applications and data, and the user's personal applications and data remain on a separate storage space that the UEM system 170 cannot see or access (and vice versa). In another example mode, the UEM management space can be the primary space of the user device 110, giving the UEM system 170 control of applications, data, and settings, and the user's personal profile can be created on a separate space that is subject to the UEM settings. In another mode, the OS 114 can allow for full UEM management of the entire user device 110. While there are numerous modes that the OS 114 can provide for facilitating UEM management of the user device 110, the term "Work Managed Mode" is used throughout to encompass any such mode.

In an example, the OS 114, or alternatively the enterprise that the user device 110 is being enrolled in, can have strict configuration restrictions for integrating a UEM management mode. For example, the OS 114 can require that the user device 110 enroll with the UEM system 170 directly after a factory reset of the user device 110. In another example, the OS 114 can require that the user device 110 enroll over a closed network 120. Other restrictions can include, for example, applying specific proxy settings, applying custom permission settings, connecting to a local auto discovery service (as opposed to a default global auto discovery service), and securing communications with a specified certificate or encryption methods.

In some examples, the user device 110 must be configured properly with these settings before communicating with the UEM server 160 for requesting enrollment. In an example, the settings and information needed to access the UEM server 160 for enrollment (hereinafter referred to as the "enrollment configuration data") can be provided using an admin console 180. The admin console 180 can be an interface that allows an admin to manage user accounts and configuration settings for an organization, such as the UEM system 170. In one example, the admin console 180 can allow the admin to create a QR code 140 with the enrollment configuration data embedded within. Although references are made herein to the QR code 140, those references are merely used as examples and are not intended to be limiting in any way. For example, QR code 140 can encompass any means for retrieving enrollment configuration data, such as a Near-Field Communication ("NFC") tag, or other types of scannable codes, such as MICROSOFT TAGS, MAXI-CODE, or BLIPPER.

Examples of enrollment configuration data embedded in the QR code 140 can include a closed network flag 142, local auto discovery settings 144, certificate data 146, closed network settings 148, proxy settings 150, permissions settings 152, UEM server settings 154, and user details 156. The closed network flag 142 can be a flag that designates whether the user device 110 must enroll over the closed network 120. The local auto discovery settings 144 can be included when a local auto discovery service is used in place of a global auto discovery service. The local auto discovery settings 144 can include instructions for connecting to the local auto discovery service, such as a flag indicating a local auto discovery service should be used and a network address, such as an Internet Protocol ("IP") address, for the local auto discovery service. When applicable, the local auto discovery settings 144 can also designate a local network that should be used to connect to the local auto discovery service.

The certificate data 146 can include a flag that designates whether a certificate is required for enrollment into the UEM system 170 and, if so, how the user device 110 can obtain the certificate. In one example, the certificate can be included in the certificate data 146. In another example, the certificate data 146 can include a network address for an endpoint device from where the user device 110 can retrieve the certificate. The closed network settings 148 can include settings for connecting to the closed network 120, such as the closed network's 120 Service Set Identifier ("SSID") and access credentials. The proxy settings 150 can designate any custom proxy settings that must be configured on the user device 110 for enrollment purposes or otherwise. The permissions settings 152 can designate any permissions of the management application 112 that must be modified or added in order to enroll. The UEM server settings 154 can include any information for connecting to the UEM server 160, such as a network address of the UEM server 160. The user details 156 can include user profile information for enrolling the user device 110, such as credentials for the user profile that the user device 110 is being enrolled under.

In an example, the admin can input the enrollment configuration data into the admin console 180, which in one example can include any or all the settings described above. The admin console 180 can create the QR code 140 with the enrollment configuration data embedded inside, either directly or by instructing a device, virtual machine, or server, such as the UEM server 160, to create the QR code 140. The QR code 140 can also include instructions that the OS 114 can use to read and execute the enrollment configuration data. For example, when the user device 110 scans the QR code 140, the OS 114 can be configured to connect to the content delivery server 130, retrieve the install file 132, and install the management application 112. In one example, the management application 112, after being installed, can be configured to retrieve the enrollment configuration data from the OS 114, apply the settings from the enrollment configuration data, and connect to the UEM server 160 over the closed network 120 to enroll the user device 110 in the UEM system 170.

Although the examples herein describe the enrollment configuration data being embedded into the QR code 140, this is merely an example and it not meant to be limiting in any way. For example, the enrollment configuration data can be provided to the user device 110 using other methods, such as Zero-touch provisioning ("ZTP"). ZTP can be particularly useful when enrolling non-user devices, such as a network switch, router, wireless access point, or firewall. When implementing ZTP enrollment, the admin console 180 can be a portal for the ZTP service. The admin can input the enrollment configuration data and provide encryption key-value pair mappings for each value in the enrollment configuration data. When a device enrolls using ZTP, a ZTP service on the closed network can retrieve the enrollment configuration data using the key value pairs and provide the enrollment configuration data to the enrolling device.

Figure 2:
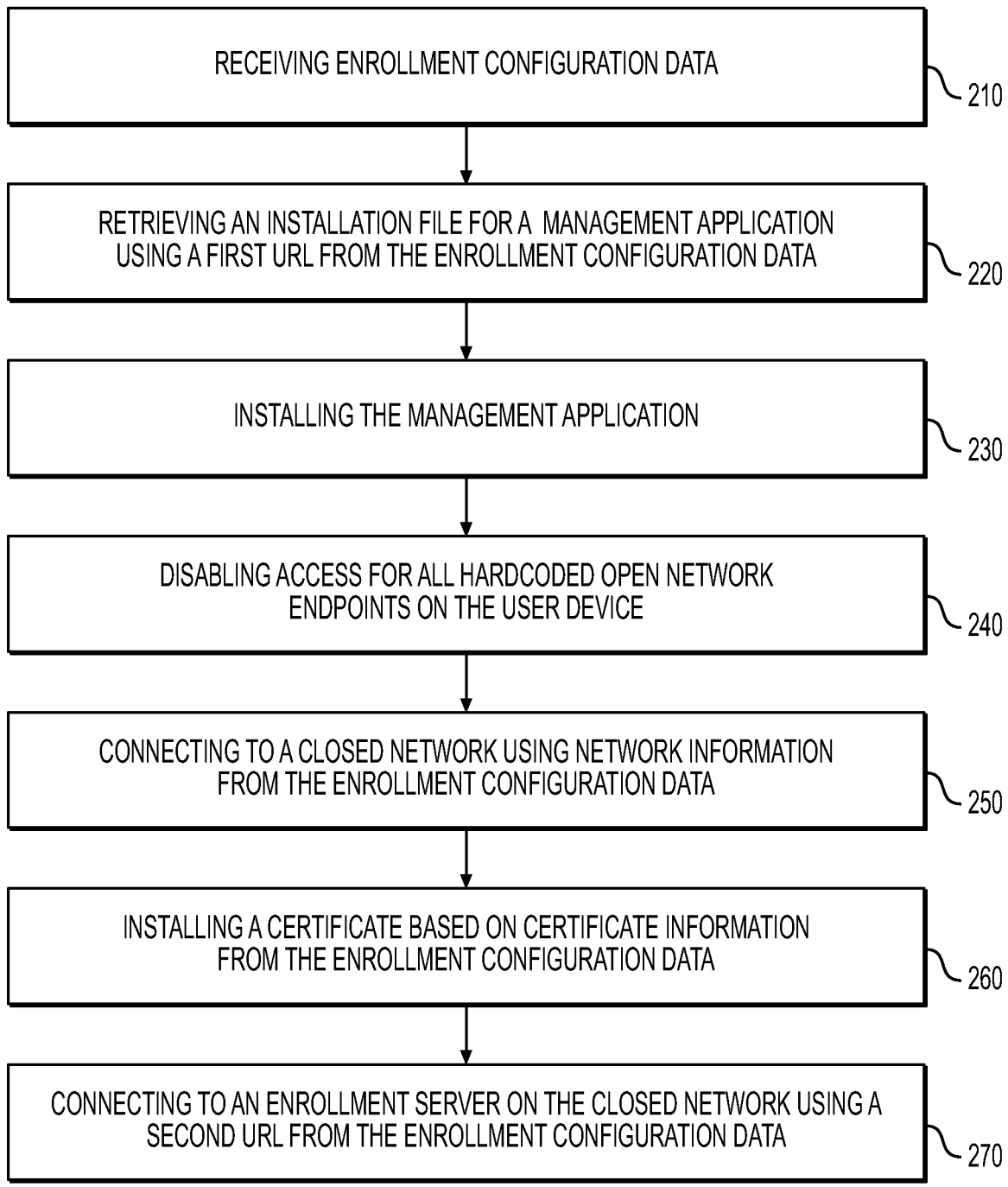
FIG. 2 is a flowchart of an example method for enrolling a user device with a UEM system over a closed network.

FIG. 2 is a flowchart of an example method for enrolling the user device 110 in a UEM system 170 over the closed network 120. At stage 210, the user device 110 can receive enrollment configuration data. The enrollment configuration data can include settings and information needed to access the UEM server 160 for enrollment. In an example, when the user device 110 first boots, the OS 114 can be configured to check to see if it has been assigned a Work Managed Mode. In one example, this configuration can be made by the original equipment manufacturer ("OEM"). If the OS 114 has been assigned an enterprise configuration, the OS 114 can initiate a managed mode and look for an endpoint URL for downloading and installing the correct UEM management application. In one example, the OS 114 can be preconfigured with the endpoint URL. In another example, the OS 114 can be preconfigured to use a certain method to retrieve the endpoint URL, such as by scanning a QR code or using ZTP. In one example, the OS 114 can present options for choosing a method for retrieving the UEM management application.

As an example, an admin can factory reset the user device 110 or boot the user device 110 for the first time. The OS 114 can be configured to initiate in a managed mode. In one example, the OS 114 can be configured by the OEM or an admin to initiate in a managed mode. The OS 114 can enable a QR code scanner on the user device 110, and the admin can scan the QR code 140. The QR code 140 can include embedded enrollment configuration data. In one example, the OS 114 can access only a portion of the enrollment configuration data. For example, the OS 114 can access a portion of the enrollment configuration data that includes instructions for retrieving and installing the install file 132. The remaining enrollment configuration data can be secured so that that it is only accessible by the management application 112 once installed. For example, the secured enrollment configuration data can be secured with a security key that is included in the install file 132.

At stage 220, the user device 110 can retrieve the install file 132 for the management application 112. In an example, the OS 114 can obtain information for retrieving the install file 132 from the enrollment configuration data. For example, the enrollment configuration data can include network information for the content delivery server 130, such as a network address, and any additional information needed to retrieve the install file 132, such as verification credentials. The user device 110 can request the install file 132 from the content delivery server 130 using the network information in the enrollment configuration data. For example, the user device 110 can make a Hypertext Transfer Protocol ("HTTP") request. In one example, the enrollment configuration data can include instructions for retrieving the install file 132. For example, the enrollment configuration data can designate whether the user device 110 can retrieve the install file 132 over an open network or if the user device 110 must connect to the closed network 120.

At stage 230, the user device 110 can install the management application 112. In an example, this can be executed by the OS 114. In an example, after installing the management application 112, the OS 114 can enable a Work Managed Mode on the user device 110. The OS 114 can also provide access to, or transfer the enrollment configuration data to the management application 112, and the management application 112 can continue the enrollment process.

At stage 240, the user device 110 can disable access for all hardcoded open network endpoints. Hardcoded open network endpoints can include network endpoints hardcoded into the OS 114. For example, the OS 114 can include network endpoints for sending OS-related information back to the OEM, such as analytics, feedback, and telemetric information. In one example, the management application 112 can disable the network endpoints based on the closed network flag 142 designation. For example, the closed network flag 142 can indicate whether the user device 110 must enroll over a closed network. If the closed network flag 142 is disabled, the management application 112 can enroll the user device 110 using any available network that meets minimum security requirements. On the other hand, if the closed network flag 142 is enabled, the management application 112 can disable any network endpoints hardcoded into the OS 114, or otherwise block any requests to utilize those hardcoded network endpoints. This can enhance the security of the enrollment process because these network endpoints are typically configured to transmit information over open networks.

At stage 250, the user device 110 can connect to the closed network 120 using closed network settings 148. For example, the closed network 120 can be a wireless network that uses WI-FI. The management application 112 can cause the user device 110 to connect to the closed network 120 using an SSID and access credentials provided in the network settings 148.

At stage 260, the user device 110 can install a certificate based on the certificate data 146. The certificate can be required for securing communications with the UEM server 160. In an example, the certificate data 146 can include information for creating the certificate or for accessing a certificate endpoint. If the certificate data 146 includes information for creating a certificate, the management application 112 can configure the certificate and install it on the user device 110. If the certificate 146 includes information regarding a certificate endpoint, the management application 112 can cause the user device 110 to send a request for the certificate to the certificate endpoint. In one example, the certificate endpoint can include network information for a certificate provider, such as a server, that issues the certificate. In another example, the user device 110 can send the request using the same network settings as was used to retrieve the install file 132. The management application 112 can install the certificate after receiving it from the certificate provider.

In an example, the management application 112 can configure other settings designated in the enrollment configuration data. For example, the enrollment configuration data can designate whether the user device 110 should connect to a global or a local auto discovery server based on the local auto discovery settings 144. In one example, the enrollment configuration data can also designate any proxy settings 150 required for communicating with the UEM server 160. In another example, the enrollment configuration data can designate permissions settings 152. The management application 112 can enable, disable, or add permissions for the management application 112 or for any other aspects of the user device 110 based on the permission settings.

At stage 270, the user device 110 can send an enrollment request to the UEM server 160 on the closed network 120 using the UEM server settings 154. The enrollment request can be sent using an HTTP request or API call, as some examples. In an example, the enrollment configuration data can designate where the user device 110 can obtain the UEM server settings 154. In one example, the UEM server settings 154 can be embedded in the QR code 140 as part of the enrollment configuration data. In another example, the UEM system 170 can require that the user device 110 connect to an auto discovery service. An auto discovery service can be a service that directs enrolling user devices to the correct server for enrollment, which can be useful for situations where multiple enrollment servers exist to serve different device types or different enrollment types.

For example, an organization can implement multiple servers for enrollment, and each server can be responsible for enrolling a different set of user devices. As an example, the organization can facilitate user device enrollment for multiple clients, and the auto discovery service can direct user devices to the UEM enrollment server assigned to the client that the user device is associated with. The auto discovery service can identify the correct UEM enrollment server based on information from the enrolling user device, such a device identifier ("ID"), a user ID, or an organization ID. In an example, the management application 112 can check the local auto discovery settings 144. The local auto discovery settings 144 can include a flag that, if enabled, causes the management application 112 to connect to an auto discovery service to retrieve the UEM server settings 154. In an example, the local auto discovery settings 144 can also include a flag that indicates whether the management application 112 should connect to a default global auto discovery service or a local auto discovery service. For example, an organization can implement an auto discovery service, but require that enrolling user devices connect to a local auto discovery service that is located within the closed network 120. If the flag is enabled, the local auto discovery settings 144 can also include network information for accessing the local auto discovery service. The management application 112 can cause the user device 110 to retrieve the UEM server settings 154 from the indicated auto discovery service.

In an example, the enrollment request can include the certificate, which the UEM server 160 can use to verify that the enrollment request is authentic. In one example, the enrollment request can include at least a portion of the user details 156. For example, the user details 156 can include credentials for a user profile that the user device 110 is being enrolled under. The UEM server 160 can authenticate the credentials to verify that the user device 110 is authorized for enrollment.

Figure 3A:
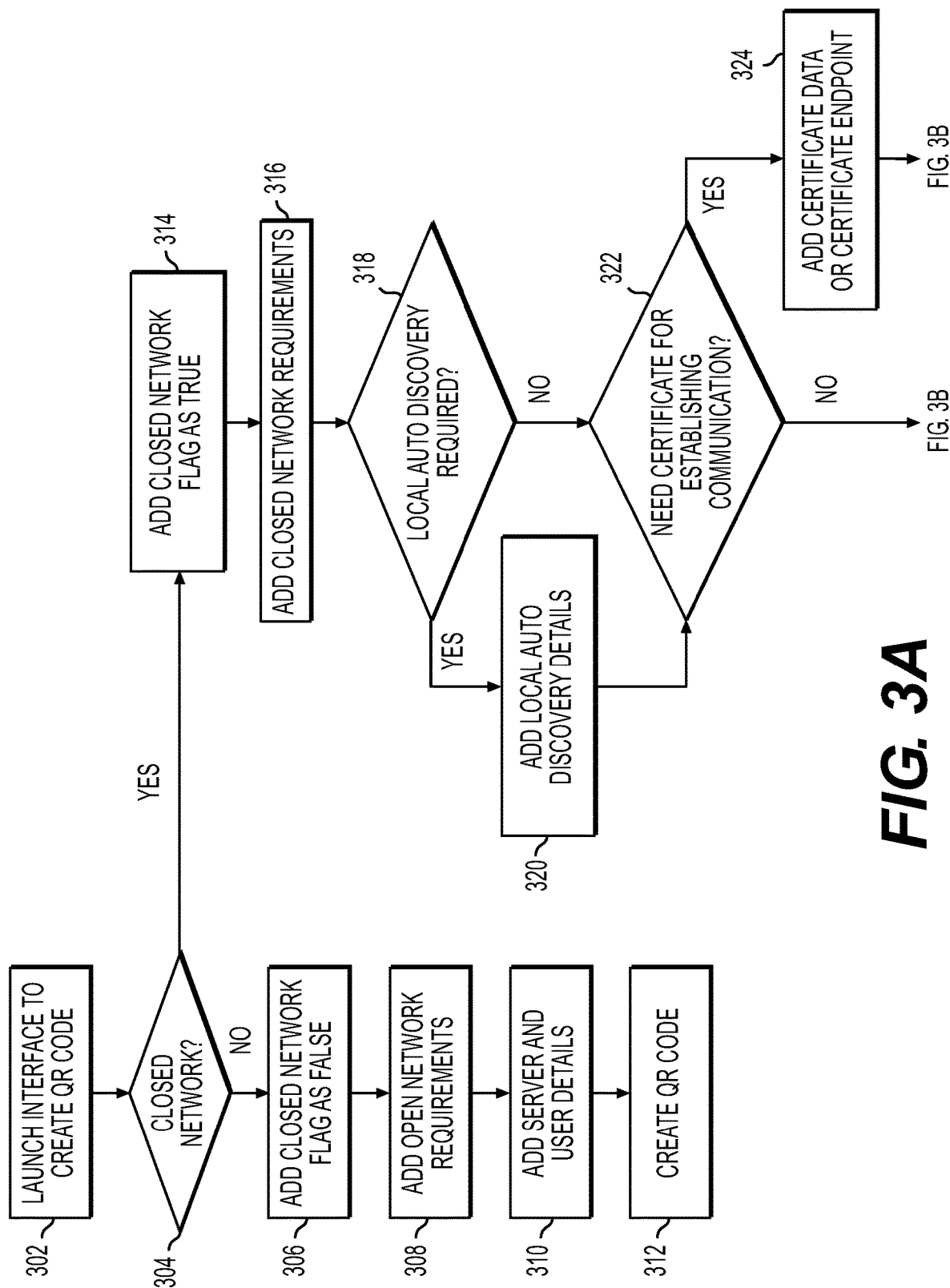
FIGS. 3A and 3B are each a portion of a flowchart of an example method for creating a QR code for enrolling a user device with a UEM system over a closed network.
Figure 3B:
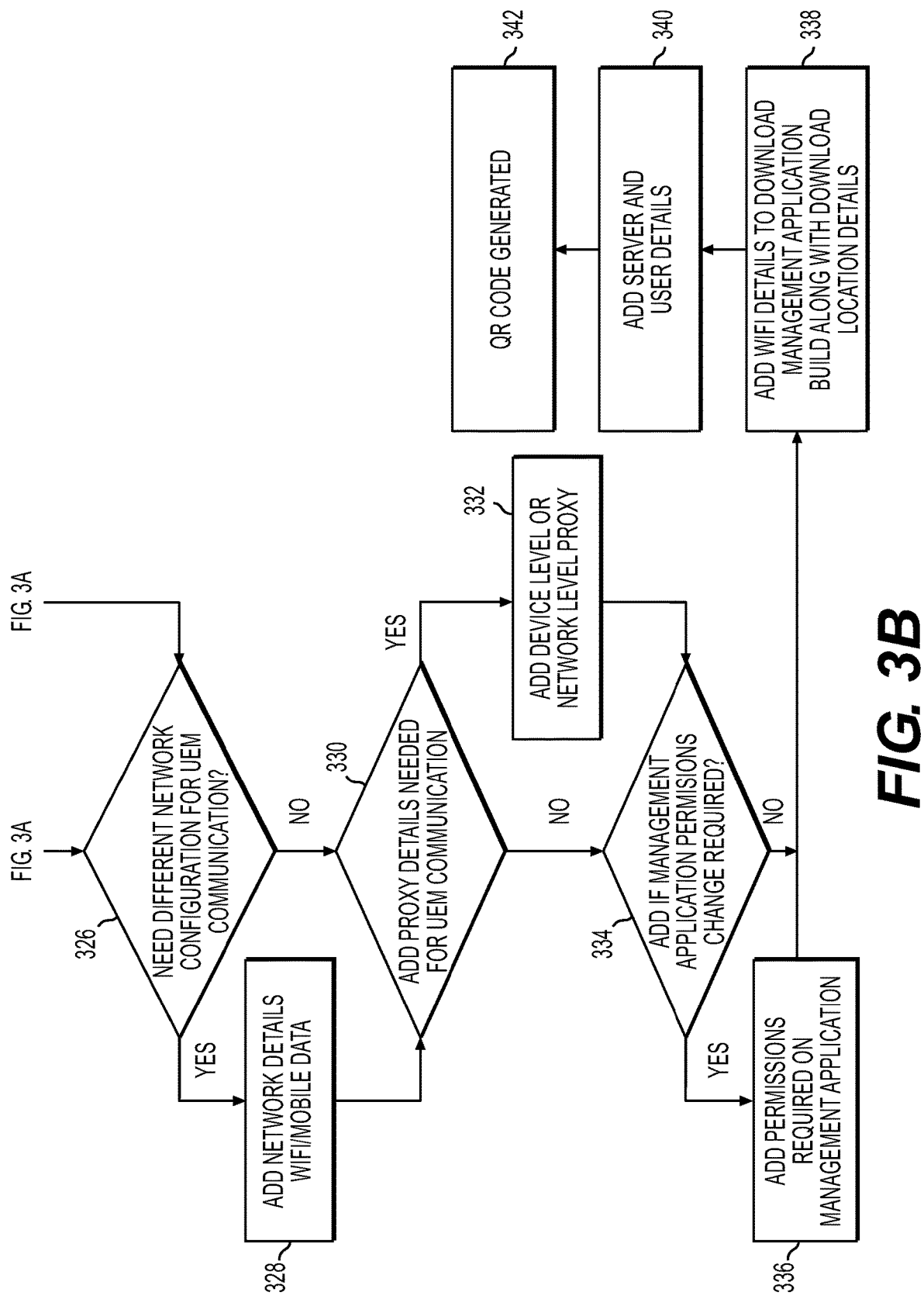

FIGS. 3A and 3B each provide a portion of a flowchart of an example method for creating a QR code for enrolling the user device 110 in a UEM system 170 over the closed network 120. At stage 302, an admin device can launch an interface for creating the QR code 140. The interface can be accessed using the admin console 180, in an example, and the admin device can be a computer, tablet, or phone that displays the console 180 interface. In one example, the interface can allow the admin to designate configuration settings for enrolling the user device 110 in the UEM system 170.

At stage 304, the method can proceed in one of two directions depending on whether the user device 110 is required to enroll on the closed network 120. In an example, the interface can include a selection mechanism, such as a toggle button or drop-down menu, that the admin can select to enable or disable the closed network flag 142. In an example, the admin can enable or disable the closed network flag 142. If enrolling on the closed network 120 is not required, the admin can disable the closed network flag 142 at stage 306. In an example, disabling the closed network flag 142 can cause the interface to present options for providing configuration settings associated with an open network enrollment. Stages 308, 310, and 312 describe stages that can occur based on the admin disabling the closed network flag 142.

At stage 308, the admin console 180 can add open network requirements. In one example, the admin can input network settings, such as an SSID and log-on credentials, of an open network that the admin knows the user device 110 will connect to for enrollment, or that the admin wants the user device 110 to connect to for enrollment. In another example, the admin can indicate in the interface that the settings are unknown, which can cause the management application 112 to prompt the user to input the open network settings when enrolling the user device 110.

At stage 310, the admin console 180 can add the UEM server settings 154 and user details 156. In an example, the UEM server settings 154 can include a network address for the UEM server 160. In one example, the UEM server settings 154 can include an auto discovery flag that the admin can enable, which can cause the management application 112 to retrieve the UEM server settings 154 from an auto discovery service.

In an example, the user details can include credentials for a user profile that the user device 110 will be enrolled under. For example, the admin can enroll numerous user devices 110 simultaneously under the same user profile. The admin can scan the QR code 140 with each enrolling user device 110, and the management application 112 can use the user details 156 to enroll each device, thus reducing the number of actions required by the admin. In one example, users can use the user devices 110 under the profile used for enrollment. In another example, the user devices 110 can enroll using a universal enrollment profile, and the management application 112 can prompt the users to log in using their personal user credentials to access the user device 110 or certain UEM features thereon. In one example where each user device is enrolled under a different user profile, the admin can make a selection in the interface that causes the management application 112 to prompt for user credentials during the enrollment process, and each user can enter their own credentials at that point. In another example, the UEM system 170 can create an individualized QR code 140 for each user enrolling a user device 110 that includes the user credentials for that user. The individualized QR codes 140 can be provided to the corresponding users, such as by email or printed and sent to the users. The users can then scan their individualized QR code 140, and the user devices 110 can handle the enrollment process from there.

At stage 312, the admin console 180 can create the QR code 140. The QR code 140 can include the disabled closed network flag 142, the open network settings, the UEM server settings 154, and the user details 156—or some combination of these items—embedded within. In one example, the interface can allow the admin to print the QR code 140, display the QR code 140 on a screen, or transmit the QR code 140 to a relevant user, so that the QR code 140 can be scanned by the user device 110.

Returning to stage 304, if enrolling on the closed network 120 is required, the admin can enable the closed network flag 142 at stage 314. In an example, enabling the closed network flag 142 can cause the interface to present options for providing configuration settings associated with a closed network enrollment. The remaining stages of FIGS. 3A and 3B below describe stages that can occur based on the admin requiring closed-network enrollment, such as by enabling the closed network flag 142.

At stage 316, the admin console 180 can receive the closed network settings 148. In one example, the admin can manually input the closed network settings 148. In another example, the closed network settings 148 can be prepopulated in the admin console 180. For example, if the other QR codes 140 have been previously created for enrolling other devices on the same closed network 120, then the admin console 180 can save the closed network settings 148 and populate those settings into subsequent QR code creations. In an example where the closed network 120 is a WI-FI network, the closed network settings 148 can include an SSID and log-on credentials of the closed network 120. In examples where the closed network 120 is not a WI-FI network, the admin can provide the connection settings associated with the network type.

At stage 318, the admin can select whether the user device 110 must retrieve the UEM server settings 154 from an auto discovery service, and, if so, whether the user device 110 must retrieve the UEM server settings 154 from a global or a local auto discovery service. If the admin designates that the user device 110 must retrieve the UEM server settings 154 from a local auto discovery service, the admin can provide the local auto discovery settings 144 at stage 320. In an example, the interface can provide a toggle switch that, when selected, populates a field for inputting the local auto discovery settings 144 based on the selection indicating that a local auto discovery service is used. If the admin designates that a local auto discovery service is not used, the method can proceed directly to stage 322.

At stage 322, the admin console 180 can receive input from the admin regarding whether a certificate is required to establish communication with the UEM server 160. For example, the UEM system 170 can require that all communications between user devices and the UEM server 160 are secured using a security certificate. As an example, the UEM server 160 can verify a certificate provided with an enrollment request to verify that the request is authentic.

If the admin selects that a certificate is required, the admin console 180 can add the certificate data 146 to the QR code at stage 322. In one example, the admin can upload or identify a certificate file or a file that the management application 112 can use to create the certificate. For example, the admin can upload a .pem, .crt, .cer, or .key certificate file. In an alternative example, the admin can provide network information for a certificate endpoint, such as the IP address of a server that issues security certificates for the UEM system 170. If the admin designates that a certificate is not required, the method can proceed directly to stage 326.

Continuing to FIG. 3B, at stage 326, the admin console 180 can receive input on whether a different network configuration is needed to communicate with the UEM server 160. For example, the UEM system 170 can allow the user device 110 to use an open network to retrieve the local auto discovery settings 144 or the certificate. In one example, the interface can provide a field for network settings that the user device 110 can use for such communications at stage 328. For example, the admin can provide network information for a specific network for the user device 110 to use, designate that the user device 110 can use any open network that meets minimum security requirements, or designate that the user device 110 can use mobile data, such 4G Long Term Evolution ("LTE") or 5G.

At stage 330, the admin console 180 can receive input on whether a proxy is required. For example, the UEM system 170 can require specific proxy settings when communicating with the UEM server 160. If the admin selects that custom proxy settings are required, the admin can input the proxy settings at stage 332. Otherwise, the method can proceed to stage 334. In one example, the proxy settings 150 can depend on an access level or network level of the user device 110. For example, the UEM system can allow various levels of access to UEM resources and data, and each level can have different proxy settings. User devices 110 can be given the proxy settings 150 for each device or network level that the user device 110 has authorization to use. For example, a user device being enrolled for an information technology ("IT") admin may be given access to a much larger portion of the UEM's network than a customer support agent. In such an example, the customer support agent's user device can be given only the proxy settings for the network levels corresponding to the agent's access level, whereas the IT admin's device may be given the proxy settings for all or most of the UEM's network levels. In an example, the admin can designate a device or network level in the admin console 180. In one example, if the admin is enrolling user devices 110 of various network or device access levels, then the admin can create multiple QR codes 140, each with a different access level (or other variations in enrollment configuration data).

At stage 334, the admin console 180 can receive input on whether permission changes to the management application 112 are required. If permission changes are required, the admin can identify the permission settings 152 using the interface at stage 336. In an example, the admin can upload a file that includes a list of permissions that should be applied or changed. In another example, the console 180 provides a list of potential permissions and allows the admin to pick some or all of those permissions to be applied. After adding the permissions at stage 336, or if no permissions changes are required at stage 334, the method can proceed to stage 338.

At stage 338, the admin console 180 can add network information for the content delivery server 130. This can include the IP address and any other information needed by the user device 110 to retrieve the install file 132 from the content delivery server 130. For example, the network information can include any credentials required to retrieve the install file 132. As another example, the network information can identity a particular WI-FI network to be used for downloading the install file 132 or management application 112.

At stage 340, the admin console 180 can allow the admin to add the UEM server settings 154 and user details 156. In an example, the UEM server settings 154 can include a network address, such as a local IP address on the closed network 120, for the UEM server 160. In an example, the user details 156 can include credentials for a user profile that the user device 110 will be enrolled under. For example, the admin can enroll numerous user devices simultaneously under the same user profile. When the admin scans the QR code 140, the management application 112 can use the user credentials to enroll the user devices. For example, the admin can scan the QR code 140 with each enrolling user device 110, and the management application 112 can use the user details 156 to enroll each device, thereby reducing the number of actions required by the admin. Users can then use the user devices 110 under the profile used for enrollment or the users can be prompted to provide their own credentials after receiving the enrolled user devices 110, depending on the example. In an alternative example, a unique QR code 140 can be created for each user enrolling a user device 110. The QR code 140 can then be sent to the corresponding users so that they can scan the QR code 140 to initiate the enrollment process, or the admin can scan each QR code 140 for the corresponding user device 110.

At stage 342, the admin console 180 can generate the QR code 140. The QR code 140 can include all the settings and information (such as the enrollment configuration data) provided by the admin starting at stage 314 above. This enrollment configuration data can be embedded in the QR code 140, in an example. In one example, portions of the enrollment configuration data can be encrypted or otherwise protected so that they are only accessible by the management application 112 after it is installed by the OS 114. In one example, the interface can allow the admin to print the QR code 140 or display the QR code 140 on a screen so that the QR code 140 can be scanned by the user device 110.

Figure 4A:
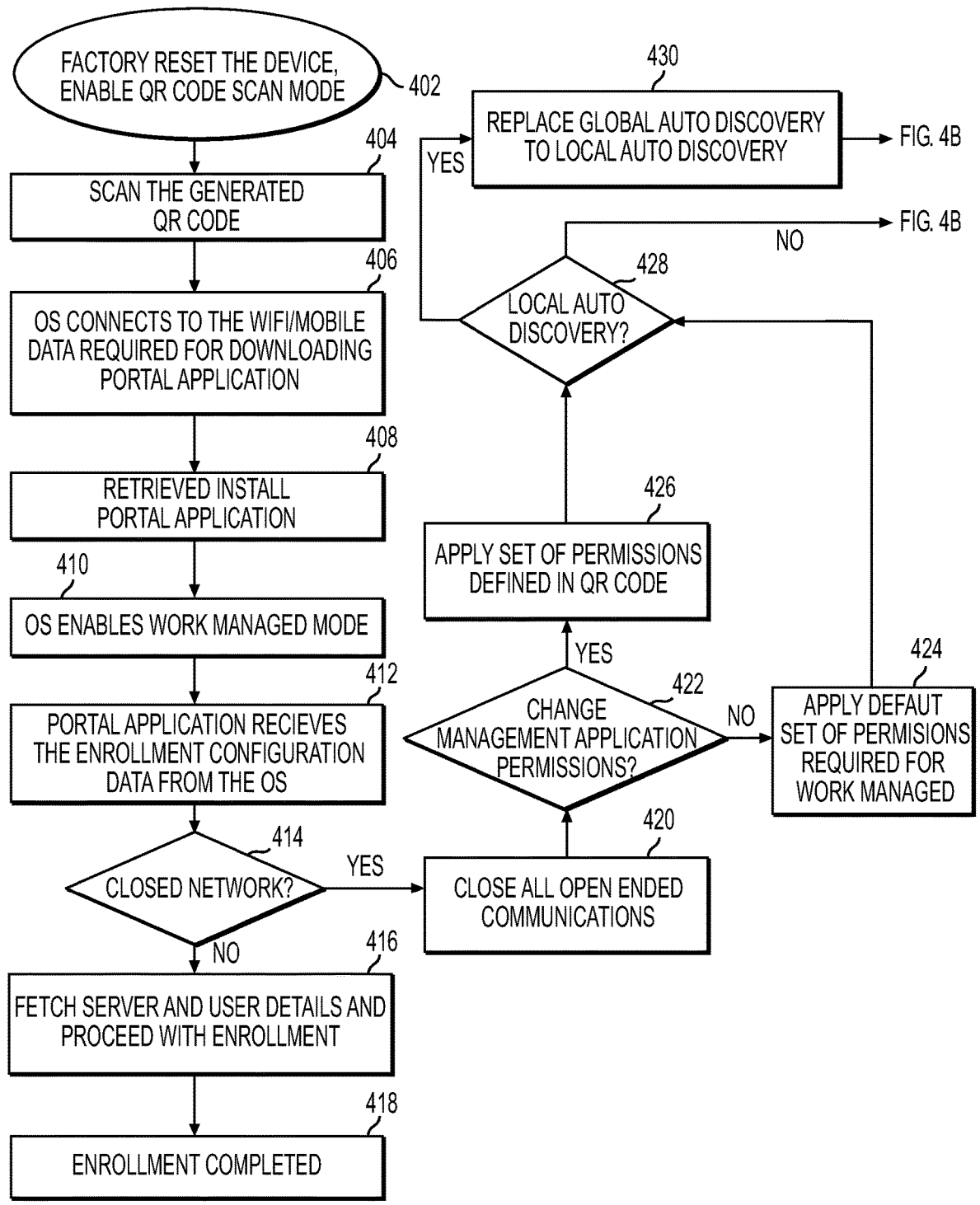
FIGS. 4A and 4B are each a portion of a flowchart of another example method for enrolling a user device with a UEM system over a closed network.
Figure 4B:
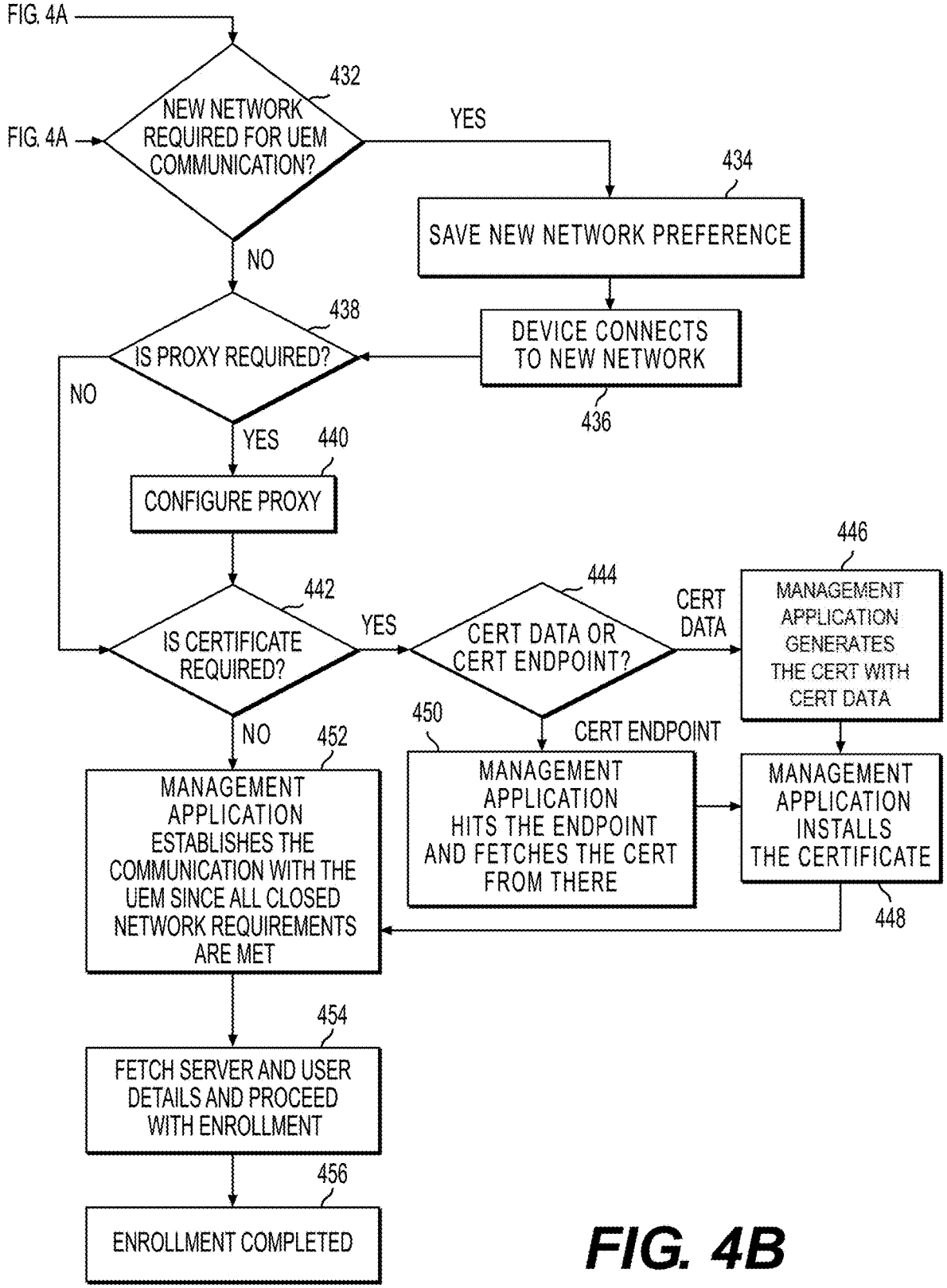

FIGS. 4A and 4B each provide a portion of a flowchart of another example method for enrolling the user device 110 in the UEM system 170 over the closed network 120. At stage 402, the user device 110 can factory reset. A factory reset can include any type of device reset that causes the user device 110 to lose any settings relevant to enrollment, such as settings for joining a network or communicating with a server. This stage can also include the user device 110 booting for the first time. For example, the UEM system 170 can require that user devices enroll using a Work Managed Mode as described previously herein. When enrolling in Work Managed Mode, the OS 114 can require that the user device 110 enroll after the first boot or after a factory reset. The user enrolling the user device 110 can factory reset the user device 110 or boot the user device 110 for the first time.

At stage 404, the user device 110 can scan the QR code 140. In an example, when the user device 110 first boots, the OS 114 can be configured to check to see if it has been assigned a Work Managed Mode. In one example, this configuration can be made by the OEM. In another example, the configuration is hardcoded into the OS 114. If configured under a Work Managed Mode, the OS 114 can initiate the assigned Work Managed Mode and look for an endpoint URL for downloading and installing the correct UEM management application 112. In one example, the OS 114 can launch, or prompt the user to launch, a QR code scanner on the user device 110, such as a camera. The user device 110 can then scan the QR code 140 using the QR code scanner. In an example, the QR code 140 can be a QR code generated using the stages described above regarding FIG. 3.

At stage 406, the user device 110 can connect to the content delivery server 130. For example, the OS 114 can retrieve enrollment configuration data from the QR code 140 that includes network information for the content delivery server 130, such as a network address, and any additionally information needed to retrieve the install file 132, such as verification credentials. In an example, the enrollment configuration data can include instructions for connecting to a local network so that the user device 110 can access the content delivery server 130. For example, the enrollment configuration data can indicate whether the user device 110 is required to connect to the content delivery server 130 on the closed network 120, can use a specified open network, or can use any open network. In examples where the user device 110 must use a specific network, the user device 110 can connect to the network using settings provided in the enrollment configuration data, such as a WI-FI SSID and log-on credentials. In one example where the user device 110 is a cellular phone, the user device 110 can use a cellular network to connect to the content delivery server 130.

At stage 408, the user device 110 can retrieve the install file 132 and install the management application 112, also referred to as a portal application in FIG. 4A. For example, the content delivery server 130 can send the install file 132 to the user device 110, and the OS 114 can install the management application 112 from the install file 132. Any other application provisioning system can be used to deliver the management application 112 to the user device 110.

At stage 410, the user device 110 can enable the assigned Work Managed Mode. In an example, this stage can be performed by the OS 114. As an example, the OS 114 can configure separate storage spaces on the user device 110 for a work profile and a personal profile, configure the user device 110 for a work profile with limited personal profile access, or configure the user device 110 for a work profile only. A work profile can correspond to a portion of the user device 110 where applications and data that are managed by the UEM system 170. In some examples, enabling the Work Managed Mode includes installing a work profile on the user device 110.

In an example, after installing the management application 112 and enabling the Work Managed Mode, the OS 114 can turn over enrollment responsibilities to the management application 112. At stage 412, the management application 112 can receive the enrollment configuration data from the OS 114. For example, after installing the management application 112, the OS 114 can transfer the enrollment configuration data to the management application 112 or alternatively make the enrollment configuration data accessible by the management application 112, such as by providing the management application 112 access to the relevant files or storage location on the user device 110.

At stage 414, the management application 112 can check the status of the closed network flag 142 provided by the QR code 140. If the closed network flag 142 is not enabled, the method can proceed to stage 416 where the management application 112 can retrieve the UEM server settings 154 and the user details 156. In an example, the UEM server settings 154 can include a network address for the UEM server 160. In one example, the UEM server settings 154 can instruct the user device 110 to retrieve the network settings of the UEM server 160 from an auto discovery server.

At stage 416, the management application 112 can enroll with the UEM server 160 over an open network. In one example, the management application 112 can cause the user device 110 to prompt the user to connect to an available WI-FI network based on a scan of available WI-FI networks. In another example, the enrollment configuration data can include network settings for an open network, and the management application 112 can cause the user device 110 to connect to that open network. In still another example, the user device 110 can connect to a cellular data network, such as a 4G LTE or 5G network.

In an example, after connecting to an open network, the user device 110 can send an enrollment request to the UEM server 160 using the UEM server settings 154 at stage 418. The enrollment request can include information required by the UEM system 170 for enrolling the user device 110, such as a user profile, credentials, and a device ID that identifies the user device 110, such as a serial number, model number, universally unique identifier ("UUID"), or an International Mobile Equipment Identity ("IMEI") number. Upon authenticating the request, the UEM server 160 can enroll the user device 110 in the UEM system 170 and send management instructions to the management application 112 for further configuring the user device 110.

Returning to stage 414, if the closed network flag 142 is enabled, the method can proceed to stage 420 where the management application 112 can disable access for all hardcoded open network endpoints on the user device 110. Hardcoded open network endpoints can include network endpoints hardcoded into the OS 114, such as endpoints for sending analytics, feedback, and telemetry information to the OEM. The OS 114 can also disable all other types of open-network communications as part of this stage.

At stage 422, the management application 112, referred to as "hub" at element 422 of FIG. 4A, can check the permissions settings 152 in the enrollment configuration data to determine if there are any changes from the default permissions of the management application 112. If the permissions settings 152 do not include changes, the method can proceed to stage 424 where the management application 112 can apply the default permissions settings relevant to Work Managed Mode. If the permissions settings 152 do include changes, the management application 112 can instead apply the permissions settings from the enrollment configuration data at stage 426.

At stage 428, the management application 112 can check the auto discovery settings in the enrollment configuration data. For example, the management application 112 can check the information derived from the QR code 140 for a flag that indicates whether an auto discovery service is used. In another example, if an auto discovery service flag is enabled, the management application 112 can check a second flag that indicates whether a local auto discovery service is required. If a global auto discovery service is used, the management application 112 can configure the user device's 110 network settings to connect to an open network only for retrieving the UEM server settings 154 from the global auto discovery service. If a local auto discovery service is used, at stage 430, the management application 112 can add the local auto discovery settings 144. This can include determining whether the enrollment configuration data indicates that the local auto discovery service can be accessed over the closed network 120. If not, the management application 112 can cause the user device 110 to retrieve the UEM server settings 154 using another network, such as an open network. If the local auto discovery service can be accessed over the closed network 120, or if no auto discovery service is used, the management application 112 can check the enrollment configuration data for an indication that a new network is required for UEM communications at stage 432 of FIG. 4B.

If the enrollment configuration data indicates that a new network is required for UEM communications at stage 432, then the management application 112 can save the network settings for the new network at stage 434. As an example, where the user device 110 connects to an open network to retrieve the install file 132, the enrollment configuration data can indicate that the user device 110 must switch to the closed network 120 to enroll. Alternatively, where the user device 110 can retrieve the install file 132 over the closed network 120, the enrollment configuration data can indicate that the user device 110 need not switch to another network for enrolling, and the method can proceed to stage 438. In examples where a different network is used for retrieving the install file 132 or accessing an auto discovery service, the management application 112 can save the closed network settings 148 to the user device 110 at stage 434, and then the user device 110 can connect to the closed network 120 at stage 436 before then proceeding to stage 438.

At stage 438, the management application 112 can determine whether the enrollment configuration data indicates that a proxy is required for UEM communication. In one example, the enrollment configuration data can include a flag that, if enabled, causes the management application 112 to apply separate proxy settings 150 from the enrollment configuration data at stage 440. If the flag is disabled, stage 440 can be skipped. In another example, the management application 112 can check for proxy settings 150 in the enrollment configuration data. If the enrollment configuration data includes proxy settings 150, the management application 112 can apply them at stage 440. Alternatively, if the enrollment configuration data does not include any proxy settings 150, the management application 112 can skip stage 440.

At stage 442, the management application 112 can check whether the enrollment configuration data indicates that a certificate is required for communication with the UEM server 160 or otherwise with the UEM system 170. If not, the method can proceed directly to stage 452. Otherwise, the management application 112 can retrieve the certificate data 146 from the enrollment configuration data. At stage 444, the management application 112 can determine whether the certificate data 146 includes information for creating a certificate or an endpoint where the user device 110 can retrieve the certificate.

If the certificate data 146 includes information for creating a certificate, the management application 112 can configure the certificate at stage 446 and install the certificate on the user device 110 at stage 448. If the certificate 146 includes a certificate endpoint, the management application 112 can cause the user device 110 to retrieve the certificate from the certificate endpoint at stage 450. The management application 112 can then install the certificate at stage 448. If no certificate is required, the management application 112 can skip stages 444, 446, 448, and 450.

At stage 452, now that the user device 110 has been configured to meet the UEM communication requirements, the user device 110 can establish communication with the UEM server 160. In one example, the user device 110 can retrieve the UEM server settings 154 at stage 454 and ping the UEM server 160 using UEM server settings 154 to verify that the UEM server 160 responds, thus verifying that the network configuration settings are correct.

At stage 454, the management application 112 can also retrieve the user details 156, which can include credentials for a user profile that the user device 110 is being enrolled under. In an example, the management application 112 can send the user details 156 in an enrollment request to the UEM server 160. In one example, the enrollment request can include the certificate, which the UEM server 160 can use to verify that the enrollment request is authentic.

At stage 456, the UEM server 160 can complete enrollment of the user device 110. For example, the UEM server 160 can authenticate credentials from the user device 156. In one example, the enrollment request can also verify a device ID included in the enrollment request. After authentication is complete, the UEM server 160 can enroll the user device 110 in the UEM system 170 and begin sending management instructions to the management application 112.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for enrolling a user device in a unified endpoint management (UEM) system over a closed network, the method comprising:
    scanning a code to acquire enrollment configuration data including a first uniform resource locator (URL) of a management application installation file, a second URL of a UEM server, information indicating that one or more hardcoded open network endpoints of an operating system (OS) of the user device are to be disabled, and access credentials for connecting to the closed network;
    downloading the management application installation file from a location specified by the first URL in the acquired enrollment configuration data, and then installing the management application on the user device using the downloaded management application installation file; and
    performing the following steps using the installed management application:
        disabling access for the one or more hardcoded open network endpoints on the OS of the user device in response to the information in the acquired enrollment configuration data indicating that the one or more hardcoded open network endpoints are to be disabled;
        connecting to the closed network using the access credentials in the acquired enrollment configuration data; and
        sending an enrollment request over the closed network to the UEM server, which is at a location specified by the second URL in the acquired enrollment configuration data.

2. The method of claim 1, wherein the acquired enrollment configuration data further includes proxy settings, the method further comprising:
    before sending the enrollment request to the UEM server, configuring settings of the user device to match the proxy settings in the acquired enrollment configuration data.

3. The method of claim 1, wherein the acquired enrollment configuration data further includes a third URL of a certificate server, the method further comprising:
    downloading a certificate from the certificate server, which is at a location specified by the third URL in the acquired enrollment configuration data, wherein the enrollment request includes the downloaded certificate.

4. The method of claim 1, wherein the UEM server authenticates the user device in response to the enrollment request, to enable the user device to access services of the UEM system.

5. The method of claim 1, wherein the acquired enrollment configuration data further includes permission settings for the installed management application, the method further comprising:
upon installing the management application, configuring settings of the user device to match the permission settings in the acquired enrollment configuration data.

6. The method of claim 1, further comprising:
prior to scanning the code, factory resetting the user device.

7. The method of claim 1, wherein the code is a quick response (QR) code.

8. A non-transitory, computer-readable medium containing instructions that, when executed by a hardware-based processor, cause the processor to perform a method for enrolling a user device in a unified endpoint management (UEM) system over a closed network, wherein the method comprises:
scanning a code to acquire enrollment configuration data including a first uniform resource locator (URL) of a management application installation file, a second URL of a UEM server, information indicating that one or more hardcoded open network endpoints of an operating system (OS) of the user device are to be disabled, and access credentials for connecting to the closed network;
downloading the management application installation file from a location specified by the first URL in the acquired enrollment configuration data, and then installing the management application on the user device using the downloaded management application installation file; and
performing the following steps using the installed management application:
disabling access for the one or more hardcoded open network endpoints on the OS of the user device in response to the information in the acquired enrollment configuration data indicating that the one or more hardcoded open network endpoints are to be disabled;
connecting to the closed network using the access credentials in the acquired enrollment configuration data; and
sending an enrollment request over the closed network to the UEM server, which is at a location specified by the second URL in the acquired enrollment configuration data.

9. The non-transitory, computer-readable medium of claim 8, wherein the acquired enrollment configuration data further includes proxy settings, and the method further comprises:
before sending the enrollment request to the UEM server, configuring settings of the user device to match the proxy settings in the acquired enrollment configuration data.

10. The non-transitory, computer-readable medium of claim 8, wherein the acquired enrollment configuration data further includes a third URL of a certificate server, and the method further comprises:
downloading a certificate from the certificate server, which is at a location specified by the third URL in the acquired enrollment configuration data, wherein the enrollment request includes the downloaded certificate.

11. The non-transitory, computer-readable medium of claim 8, wherein the UEM server authenticates the user device in response to the enrollment request, to enable the user device to access services of the UEM system.

12. The non-transitory, computer-readable medium of claim 8, wherein the acquired enrollment configuration data further includes permission settings for the installed management application, and the method further comprises:
upon installing the management application, configuring settings of the user device to match the permission settings in the acquired enrollment configuration data.

13. The non-transitory, computer-readable medium of claim 8, wherein the method further comprises:
prior to scanning the code, factory resetting the user device.

14. The non-transitory, computer-readable medium of claim 8, wherein the code is a quick response (QR) code.

15. A user device comprising memory and a hardware-based processor configured to execute instructions stored in the memory to enroll the user device in a unified endpoint management (UEM) system over a closed network, by performing the following steps:
scanning a code to acquire enrollment configuration data including a first uniform resource locator (URL) of a management application installation file, a second URL of a UEM server, information indicating that one or more hardcoded open network endpoints of an operating system (OS) of the user device are to be disabled, and access credentials for connecting to the closed network;
downloading the management application installation file from a location specified by the first URL in the acquired enrollment configuration data, and then installing the management application on the user device using the downloaded management application installation file; and
performing the following using the installed management application:
disabling access for the one or more hardcoded open network endpoints on the OS of the user device in response to the information in the acquired enrollment configuration data indicating that the one or more hardcoded open network endpoints are to be disabled;
connecting to the closed network using the access credentials in the acquired enrollment configuration data; and
sending an enrollment request over the closed network to the UEM server, which is at a location specified by the second URL in the acquired enrollment configuration data.

16. The user device of claim 15, wherein the acquired enrollment configuration data further includes proxy settings, and the steps further include:
before sending the enrollment request to the UEM server, configuring settings of the user device to match the proxy settings in the acquired enrollment configuration data.

17. The user device of claim 15, wherein the acquired enrollment configuration data further includes a third URL of a certificate server, and the steps further include:
downloading a certificate from the certificate server, which is at a location specified by the third URL in the acquired enrollment configuration data, wherein the enrollment request includes the downloaded certificate.

18. The user device of claim 15, wherein the acquired enrollment configuration data further includes permission settings for the installed management application, and the steps further include:
- upon installing the management application, configuring settings of the user device to match the permission settings in the acquired enrollment configuration data.

19. The user device of claim 15, wherein the steps further include:
- prior to scanning the code, factory resetting the user device.

20. The user device of claim 15, wherein the acquired enrollment configuration data further includes an indication that a certificate is required for enrolling in the UEM system, and the steps further include:
- downloading the certificate from a certificate server in response to the indication in the acquired enrollment configuration data that the certificate is required for enrolling in the UEM system, wherein the enrollment request includes the downloaded certificate.

* * * * *